UNITED STATES PATENT OFFICE.

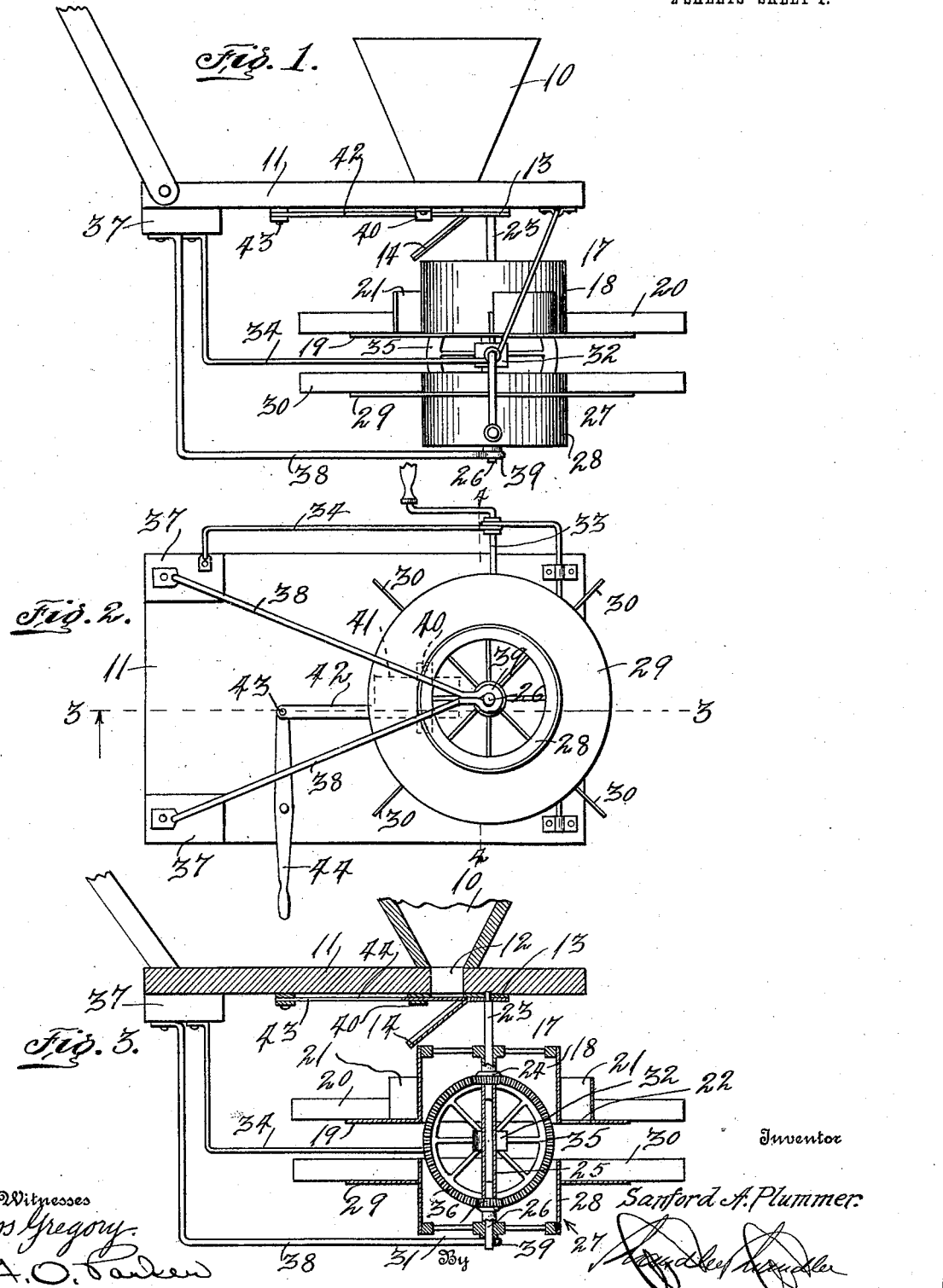

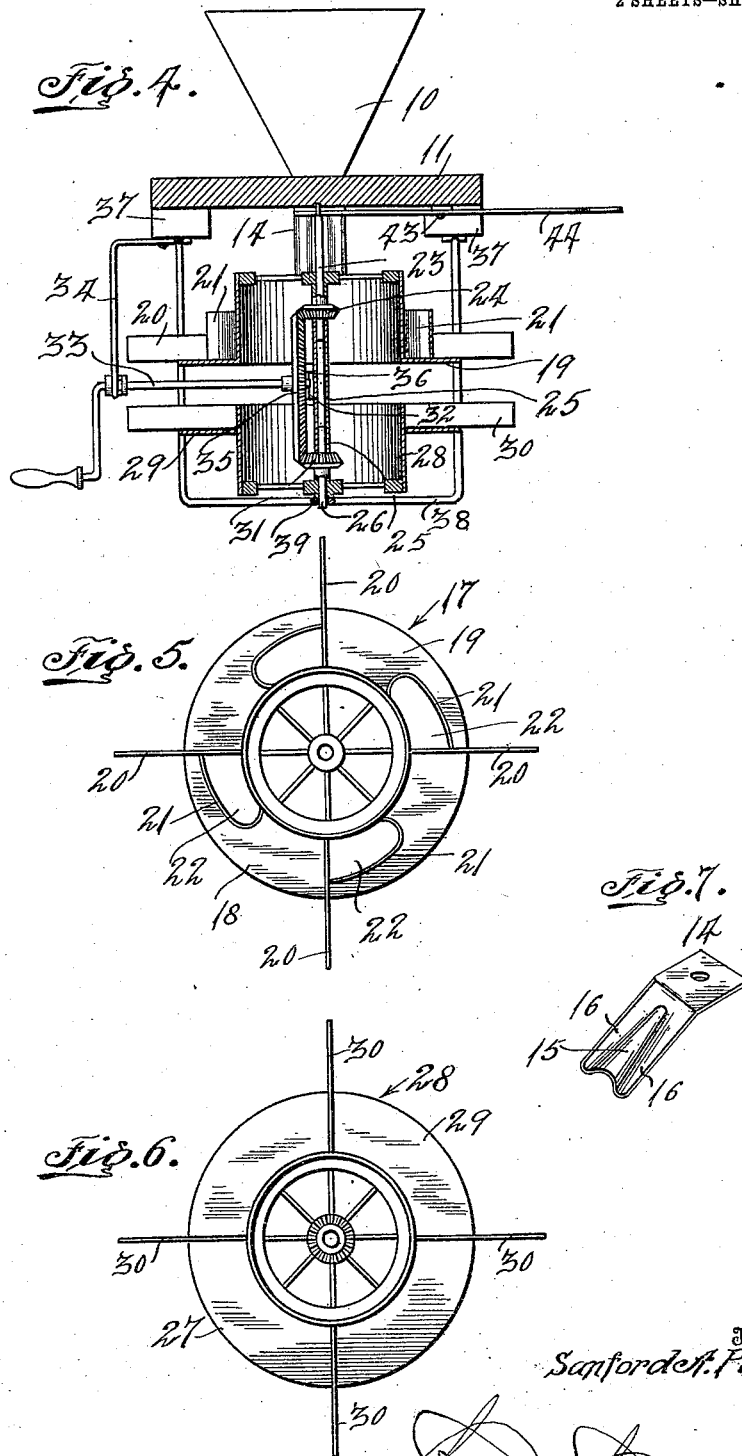

SANFORD A. PLUMMER, OF WEST NEWTON, INDIANA.

SEED-SOWER.

940,891.   Specification of Letters Patent.   Patented Nov. 23, 1909.

Application filed December 30, 1908. Serial No. 470,079.

*To all whom it may concern:*

Be it known that I, SANFORD A. PLUMMER, a citizen of the United States, residing at West Newton, in the county of Marion, State of Indiana, have invented certain new and useful Improvements in Seed-Sowers; and I do hereby declare the following to be a full, clear, and exact description of the invention, such as will enable others skilled in the art to which it appertains to make and use the same.

The invention relates to centrifugal seed sowers and more particularly to the class of seeders in which two reversely revolving distributing pans receive seed uniformly from the source of supply and adapted to distribute the seed equally from both sides of the machine.

The primary object of the invention is the provision of a machine of this class in which the rotary seed pan will act upon seed deposited thereon from a source of supply so as to distribute the seed in a uniform manner from the machine.

Another object of the invention is the provision of a machine of this character which shall possess superior advantages in point of simplicity, comprising few parts, durable, thoroughly efficient in operation and inexpensive in the manufacture.

With these and other objects in view the invention consists in the construction, combination and arrangement of parts which will be hereinafter fully described and particularly pointed out in the claims.

In the accompanying drawings there is shown a simple and preferred form of embodiment of the invention but it is to be understood that changes, variations and modifications may be made without departing from the spirit of the invention and I therefore do not desire to be limited to the precise structural details shown.

In the said drawings: Figure 1 is a side elevation of a machine in accordonce with the invention. Fig. 2 is a bottom plan view of the same. Fig. 3 is a longitudinal sectional view on the line 3—3 of Fig. 2. Fig. 4 is a transverse sectional view on the line 4—4 of Fig. 2. Fig. 5 is a plan view of the upper seed distributing pan. Fig. 6 is a plan view of the lower seed distributing pan. Fig. 7 is a perspective view of the seed chute detached.

Similar reference characters indicate corresponding parts throughout the several views in the drawings.

In the drawings, the numeral 10 designates a grain receptacle which may be of any suitable form and material, open at its upper end and connected at its lower end to a grain board 11 which latter is preferably of flat rectangular shape or approximately so although it may be of any other contour. Formed in the grain board 11 near one end thereof is a circular opening 12 forming a discharge port or outlet from the grain receptacle 10 and suitably secured to the underside of the grain board 11 is a flat plate 13 the latter containing an opening in register with and corresponding in shape with respect to the opening 12 in the grain board. Secured to the plate 13 and depending therefrom at an inclination is a casting forming a seed chute 14 the latter having a central raised rib 15. At opposite sides of this rib 15 are channels 16 which latter cause a stream or flow of seed therein so as to produce independent and separated streams of seed as it is discharged from the grain receptacle.

Immediately below the seed chute 14 is an upper seed distributing pan 17 which comprises a cup-shaped body 18 formed with an outwardly projecting annular flange 19 upon the upper face of which are radially disposed vertical fingers or blades 20 and positioned contiguous with and at the inner ends of the latter are pockets 21 with outlet ports 22 formed in the annular flange 19 of the pan. Mounted centrally in the body 18 is spindle 23 having formed thereon a beveled pinion 24 the same being disposed within the said cup-shaped body. The upper end of the spindle has its bearing in the plate 13 directly in rear of the seed chute 14 while the opposite end of the said spindle 23 loosely fits within a hollow spacer shaft 25 the same loosely receiving in its lower end the spindle 26 secured centrally in a lower seed distributing pan 27 which latter is formed of a cup-shaped body 28 with an outwardly projecting annular flange 29 the same having rising from its upper face radially disposed vertical fingers or blades 30 which are similar to the blades or fingers of the upper seed distributing pan.

Formed on the spindle 26 is a beveled pinion 31 disposed within the lower seed distributing pan. Formed integral with and located centrally of the hollow spacer shaft 25 is a bearing ear 32 in which is journaled the inner end of a hand crank 33, which latter is also journaled in a bracket 34 fixed to the grain board.

Fixed to the crank 33 is a gear wheel 35 having peripheral teeth 36 in mesh with the beveled pinions 24 and 31 respectively and which gear wheel forms the driving medium for revolving the grain pans 17 and 27 in opposite directions with respect to each other.

Arranged at one end of the grain board 11 are spaced blocks 37 depending from the under face of said grain board and into which is fitted the inner ends of a spider frame 38 constructed of wire or other suitable material and is provided with an eye 39 forming a bearing for the lower end of the spindle 26 mounted in the lower seed distributing pan. The spider frame 38 serves to firmly secure the grain distributing pans in their relative position with respect to each other and to hold the same suspended under the grain board of the machine.

Secured to the under side of the grain board 11 and extending across the plate 13 is a bridge strap or piece 40 forming a guide for a sliding cut off plate 41 having an extension 42 to which is pivotally connected as at 43 the inner end of a hand-operable shifting lever 44 the latter projecting out from one side of the grain board 11 so that the lever can be manipulated by an operator to regulate the discharge of seed from the grain receptacle 10 to the upper seed pan and also if desired entirely shut off the supply from said receptacle to the grain pan.

The operation and advantages of the invention will be readily understood from the foregoing description taken in connection with the drawings hereunto annexed. It will be obvious that the quantity of seed permitted to drop from the receptacle 10 through the seed opening in the grain board onto the seed chute 14 is capable of being regulated by the cut-off 41 as the occasion may demand. From the seed chute 14 the grain will be caused to flow in separate and independent streams onto the upper seed pan 17 which latter being provided with seed ports 22, the same extends only one-half of the space between the radial blades, will permit one-half of the seed or grain to deposit on the upper pan and the other half drop upon the lower seed distributing pan 27. The seed distributing pans being rotated with the desired degree of rapidity in opposite directions, it is obvious that the seed deposited upon the pan will be scattered in an outward direction by the centrifugal force evolved and also that owing to the presence of the radial blades the seed will be scattered over a larger area during the operation of the machine than would be the case if no blades were provided.

What is claimed is—

1. In a machine of the class described, a grain board, superposed seed pans arranged in spaced relation to each other, each pan formed of a cup-shaped body having an annular flange at right angles to the side of the body, pinions fixed centrally to said pans, a driving gear enmeshing with said pinions to actuate the same in opposite directions, radially disposed vertical blades rising from said flanges, each blade extending from the body of said pan to a considerable distance beyond said flange, each flange containing openings each one-half the space between said blades, and a seed chute extending from the grain board to a distance beyond the body of the uppermost pan to deposit seed upon the flange thereof.

2. In a machine of the class described, a grain board, superposed seed pans arranged in spaced relation to each other, each pan formed of a cup-shaped body having an annular flange at right angles to the side of the body, pinions fixed centrally to said pans, a driving gear enmeshing with said pinions to actuate the same in opposite directions, radially disposed vertical blades rising from said flanges, each blade extending from the body of said pan to a considerable distance beyond said flange, each flange containing openings each one-half the space between said blades, a seed chute extending from the grain board to a distance beyond the body of the uppermost pan to deposit seed upon the flange thereof and a hopper on said grain board in communication with said chute.

3. In a machine of the class described, a grain board, superposed seed pans arranged in spaced relation to each other, each pan formed of a cup-shaped body having an annular flange at right angles to the side of the body, pinions fixed centrally to said pans, a driving gear enmeshing with said pinions to actuate the same in opposite directions, radially disposed vertical blades rising from said flanges, each blade extending from the body of said pan to a considerable distance beyond said flange, each flange containing openings each one-half the space between said blades, a seed chute extending from the grain board to a distance beyond the body of the uppermost pan to deposit seed upon the flange thereof, a hopper on said grain board in communication with said chute and a cut off means regulating the communication in the hopper and chute.

4. In a machine of the class described, a grain board, superposed seed pans arranged in spaced relation to each other, each pan formed of a cup-shaped body having an annular flange at right angles to the side of the body, pinions fixed centrally to said pans, a driving gear enmeshing with said pinions to actuate the same in opposite directions, radially disposed vertical blades rising from said flanges, each blade extending from the body of said pan to a considerable distance beyond said flange, each flange containing openings each one-half the space between said blades, a seed chute extending from the grain board to a distance beyond the body of the uppermost pan to deposit seed upon the flange thereof, a hopper on said grain board in communication with said chute, a cut off means regulating the communication in the hopper and chute and a manually operable turning crank actuating said driving gear.

In testimony whereof, I affix my signature, in presence of two witnesses.

SANFORD A. PLUMMER.

Witnesses:
   JOHN D. HAWORTH,
   ABRAHAM STUTSMAN.